June 13, 1933. H. F. McCRAY 1,913,680
APPARATUS FOR PURIFYING AND COOLING OIL AND OTHER FLUIDS
Filed June 30, 1926
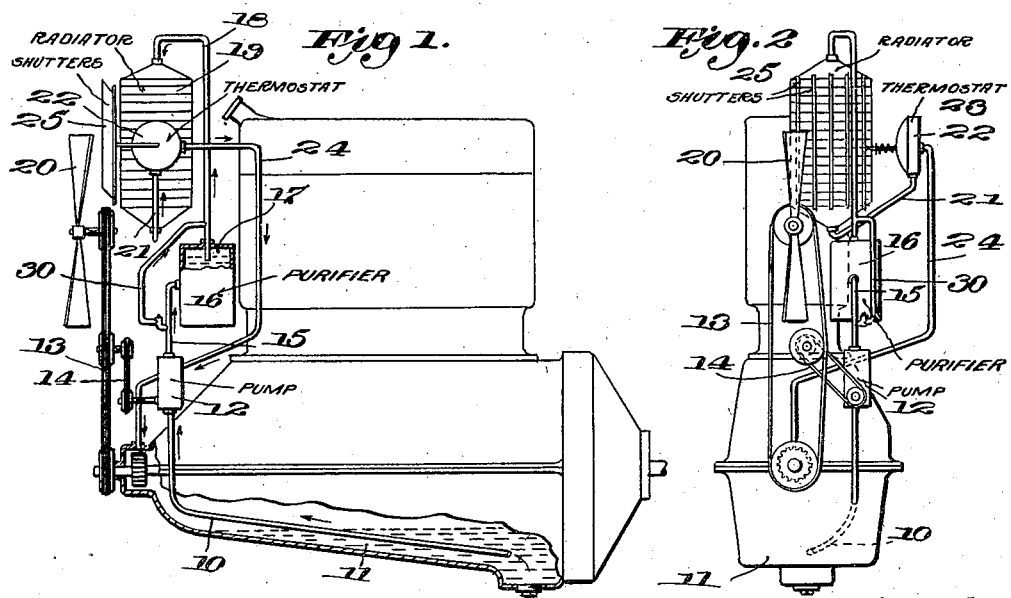
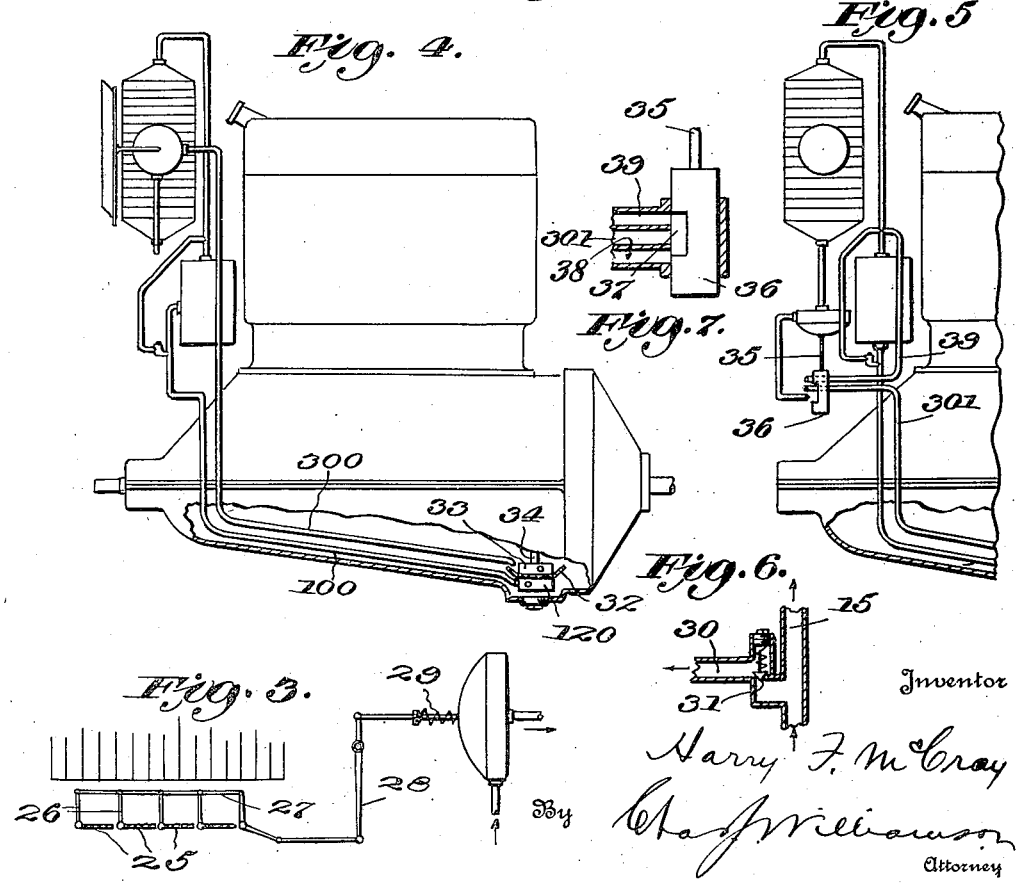

Patented June 13, 1933

1,913,680

UNITED STATES PATENT OFFICE

HARRY F. McCRAY, OF RENO, NEVADA

APPARATUS FOR PURIFYING AND COOLING OIL AND OTHER FLUIDS

Application filed June 30, 1926. Serial No. 119,678.

My invention has to do with the purification and cooling of fluids, and I have developed my invention with especial reference to purification and cooling of lubricating oil in engines for motor cars, but it is to be understood that in its broadest aspect, my invention extends to the application thereof to the purification and cooling of fluids other than liquids. The object of my invention is to provide means for the efficient and economical purification and cooling of fluids which are employed in apparatus for industrial use. I illustrate in the drawing, and shall describe several embodiments of my invention for the purification and cooling of oil used in the power plants of motor cars, bearing in mind what has just been said as to the widest scope of my invention. My invention consists in whatever is described by or is included within the terms or scope of the appended claims.

In the drawing:

Fig. 1 is a side elevation somewhat diagrammatic of a gas engine in which my invention is embodied;

Fig. 2 is an end elevation thereof;

Fig. 3 is a detail view of the thermostat device shown in Figs. 1 and 2 for controlling the oil temperature;

Fig. 4 is a view similar to Fig. 1 illustrating another embodiment of my invention;

Fig. 5 is a view similar to Figs. 1 and 4 of yet another embodiment of my invention.

Figs. 6 and 7 are detail views of valve mechanism that may be used.

In all of the embodiments of my invention shown in the drawing, the oil to be cleaned or purified and cooled is taken from a low point in the crank case by means of a pump, and passed through a purifying device, or filter, or cleaning device of any description, and after being purified or cleaned, is passed through a cooling device which may be of radiator form which is under the control of a thermostat whose action depends upon the oil temperature, and finally after being purified and cooled or brought to the desired degree of temperature, the oil is delivered to such parts of the engine as require lubrication.

Referring first to what is shown in Figs. 1 and 2, a pipe, 10, with its inlet situated at a convenient part of the crank case, 11, of the engine runs to a pump, 12 which may be of the intermeshing gear type and which may be located so that power may conveniently be taken from the fan belt, 13, to operate it. Gearing for driving the pump from the fan belt is designated, 14. The pipe, 10, of course, is on the inlet side of the pump. From the pump outlet a pipe, 15, runs to a filter or other form of purifier, 16, having in its upper part an air chamber, 17, and from the purifier a pipe, 18, extends to the top of the cooler or radiator, 19, which is situated adjacent the fan, 20, so that air for cooling will be directed by the fan to the radiator. From the bottom of the radiator or cooler, a pipe, 21, conducts the oil to the chamber, 22, of a thermostat, 23 and from such thermostat chamber, the oil flows through a pipe, 24, for delivery or distribution to those parts of the engine that are to be lubricated. The thermostat, may, of course, be of any desired construction, such for example, as the well known construction employing ether or other volatile or readily expansible heat sensitive fluid. The movement of the thermostat diaphragm under oil temperature changes is utilized to control the passage of air to the oil cooler or radiator from the fan, as by causing the opening and closing of a series of shutters, 25, mounted between the fan and the oil cooler. As shown best in Fig. 3 each shutter has a crank, 26, and the series of cranks are connected by links, 27, and to an end shutter crank, there is connected a lever and linkage mechanism, 28, which is also connected with the thermostat diaphragm. The coil spring, 29, shown conventionally in Fig. 3 moves the diaphragm and linkage upon contraction of the volume of the heat sensitive fluid of the thermostat.

I provide for the possible clogging of the filter or purifier, and consequent obstruction of flow of oil therethrough by a by-pass pipe, 30, which connects the inlet and outlet pipes of the purifier, and which contains a check valve, 31, which normally when the purifier is in proper operation prevents the flow of oil through the by-pass.

Should the circulating pump be mounted at such a height as to make it desirable so to do, a check valve may be placed in the intake pipe, 10, which will keep the pump primed at all times.

In the embodiment of my invention shown in Fig. 4 the oil pump, 120, is placed in the crank case and takes oil directly from the crank case and forces it through a pipe, 100, which conveys the oil to a filter or purifier, and from thence, to the radiator or cooler having a thermostat control which with the other parts are in all respects essentially the same as those shown in Fig. 1, and the purified and cooled oil is conveyed by a pipe, 300, to a receptacle, 32, in the crank case from which the purified and cooled oil is taken by a pump, 33, and distributed through a pipe, 34, to the bearings or other parts of the engine requiring lubrication. Or instead of the oil being delivered to the receptacle, 32, it may be delivered from the pipe, 300, and thus the pump, 33 may be omitted.

That form of my invention shown in Fig. 5 has the purifier, radiator or cooler, and by-pass with a check valve, all as shown in Figs. 1 and 4, and the pump arrangement shown in Fig. 4, but the thermostat instead of opening and closing shutters interposed between the radiator and the fan is employed to control the flow of the oil through the circulating pipes according to its temperature. The thermostat shown in Fig. 5 has a stem, 35, between its diaphragm, and a slide valve, 36, which has a port, 37, which by the movement of the valve changes the connection or communication between the three pipes 38, 39 and 301. When the oil is too cold the slide valve is in position to cause the oil to flow through pipe, 39, so that a large proportion will not pass through the radiator or cooler. If the oil is too hot, the slide valve is in position to close the port for pipe, 39, and allow flow to the cooler, and thence, to the pipe which delivers or distributes the oil to the engine parts.

The slide valve has port, 37, sufficiently long to span the opening of pipe, 39, and the opening of pipe, 301, also a fraction of the port opening from the thermostat outlet pipe, which thus permits a portion of the flow of the oil from the radiator to the thermostat to assure its proper operation when the temperature is raised. The slide valve also has sufficient lap to entirely close pipe, 39, and at the same time allow the other two pipes to be in full communication.

It will be seen from the embodiments of my invention I have selected for illustration that the temperature of the oil is automatically regulated by a thermostat which responds to the temperature of the oil passing through it, and that control may be accomplished by the automatic operation of shutters which regulate or control the flow of cooling air to a radiator, or by means of a valve controlled by-pass, which regulates or controls the circulation of oil, so that in greater or less part it may be circulated, through the cooling device. If desired, both methods of thermostat control may be employed in the same system or organization.

What I claim is:

1. The combination of means for circulating in several channels a fluid in a closed circuit which includes a place of use of the fluid in a normal state, and a receptacle into which it passes after such use, means for modifying the physical conditions of such fluid to which the fluid in circulation is subjected, a thermostat situated to be acted on by such circulating fluid, and means operated by the thermostat for determining the channel of the circulating fluid the place of action by the fluid on the thermostat being after the fluid has been conditioned and before its return to the place of use.

2. The combination of means for circulating in several channels a fluid in a closed circuit which includes a place of use of the fluid in a normal state, and a receptacle into which it passes after such use, a temperature modifier to which the fluid in circulation may be subjected, a thermostat situated to be acted on by such circulating fluid at a point between said modifier and such place of use, and means operated by the thermostat for determining the channel of the circulating fluid.

3. The combination of means for circulating in several channels a fluid in a closed circuit which includes a place of use of the fluid in a normal state, and a receptacle into which it passes after such use, a purifier to which the fluid in circulation may be subjected, a thermostat located external to said receptacle and situated to be acted on by such circulating fluid at a point between said purifier and such place of use, and means operated by the thermostat for determining the channel of the circulating fluid.

4. The combination of means for circulating in several channels a fluid in a closed circuit which includes a place of use of the fluid in a normal state, and a receptacle into which it passes after such use, means for modifying the physical conditions of such fluid to which the fluid in circulation is subjected, a thermostat located external to said receptacle and situated to be acted on by such circulating fluid, means operated by the thermostat for determining the channel of the circulating fluid, and a valved-by-pass associated with such modifying means.

5. The combination of means for circulating in several channels a fluid in a closed circuit which includes a place of use of the fluid in a normal state, and a receptacle into which it passes after such use, a purifier to which the fluid in circulation may be subjected, a thermostat located external to said receptacle and situated to be acted on by such circulating fluid, means operated by the thermostat for determining the channel of the circulating fluid, and a valved-by-pass associated with said purifier.

6. The combination of means for circulating in several channels a fluid in a closed circuit which includes a place of use of the fluid in a normal state, and a receptacle into which it passes after such use, including a purifier and a cooler, a connection from purifier to cooler, a valved-by-pass around the purifier, a thermostat located external to said receptacle and having a passage through which the fluid flows, and means operated by the thermostat for determining the channel of the circulating fluid.

In testimony whereof I hereunto affix my signature.

HARRY F. McCRAY.